United States Patent
Yliaho et al.

(10) Patent No.: US 10,194,239 B2
(45) Date of Patent: Jan. 29, 2019

(54) MULTI-RESOLUTION AUDIO SIGNALS

(71) Applicant: Nokia Corporation, Espoo (FI)

(72) Inventors: Marko T. Yliaho, Tampere (FI); Ari J. Koski, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 477 days.

(21) Appl. No.: 13/669,932

(22) Filed: Nov. 6, 2012

(65) Prior Publication Data

US 2014/0126751 A1   May 8, 2014

(51) Int. Cl.
*H04R 3/00* (2006.01)
*G11B 20/10* (2006.01)

(52) U.S. Cl.
CPC ...... *H04R 3/00* (2013.01); *G11B 2020/10546* (2013.01); *H04R 2227/005* (2013.01); *H04R 2410/03* (2013.01); *H04R 2499/11* (2013.01)

(58) Field of Classification Search
CPC ............... H04R 3/00; H04R 2227/005; H04R 2410/03; H04R 2499/11; G11B 2020/10546; G11B 2020/00028; G11B 20/10601; G11B 27/105; G11B 27/329; G11B 27/34; G11B 20/10527; G11B 20/10; G11B 20/12
USPC .......... 381/122, 74, 71.6, 71.7, 73.1, 119, 1; 707/E17.009; 715/748, 727; 700/94; 709/204, 271, 219; 348/207.99, E05.026
See application file for complete search history.

(56) References Cited

U.S. PATENT DOCUMENTS

| | | | | |
|---|---|---|---|---|
| 4,007,547 A | * | 2/1977 | Butler | G09B 5/04 360/2 |
| RE29,360 E | * | 8/1977 | Takahashi | G11B 3/00 369/90 |
| 4,335,278 A | * | 6/1982 | Chee | H04M 1/647 360/61 |
| 4,546,687 A | * | 10/1985 | Minami | G10H 1/0008 84/477 R |
| 5,951,302 A | * | 9/1999 | Decker, Jr. | G11B 31/00 434/156 |
| 6,011,853 A | * | 1/2000 | Koski | H04L 1/20 381/103 |
| 6,518,878 B1 | * | 2/2003 | Skoff | G08B 7/06 340/506 |

(Continued)

FOREIGN PATENT DOCUMENTS

| EP | 0877369 A1 | * | 11/1998 | ....... G11B 20/00992 |
|---|---|---|---|---|
| EP | 0877369 A1 | | 11/1998 | |

(Continued)

*Primary Examiner* — Yogeshkumar Patel
(74) *Attorney, Agent, or Firm* — Harrington & Smith

(57) ABSTRACT

An apparatus including at least one microphone; audio circuitry connected to the at least one microphone; and a memory connected to the audio circuitry. The audio circuitry is configured to output a first audio track and at least one second audio track. The audio circuitry is configured to form the first audio track from an output signal, provided by the at least one microphone, by processing the output signal with a first audio configuring, and where the audio circuitry is configured to form the at least one second audio track from the output signal, provided by the at least one microphone, without the first audio configuring. The memory is configured to store the first audio track and the at least one second audio track together.

14 Claims, 7 Drawing Sheets

(56) References Cited

U.S. PATENT DOCUMENTS

| | | | | |
|---|---|---|---|---|
| 6,782,104 B1* | 8/2004 | Vieilledent | H04R 1/406 | 381/122 |
| 7,331,310 B1* | 2/2008 | Sersland | A01K 15/021 | 119/712 |
| 7,581,016 B1* | 8/2009 | Stallkamp | H04N 21/226 | 370/231 |
| 8,346,862 B2* | 1/2013 | Kraft | H04L 12/1818 | 709/204 |
| 8,374,574 B1* | 2/2013 | Alberth, Jr. | H04M 1/72541 | 379/33 |
| 8,488,805 B1* | 7/2013 | Santos | H04M 9/08 | 379/392 |
| 8,922,653 B1* | 12/2014 | Reeve | H04N 7/181 | 348/143 |
| 2002/0057808 A1* | 5/2002 | Goldstein | H04R 25/356 | 381/106 |
| 2002/0120362 A1* | 8/2002 | Lathan | A63F 13/00 | 700/245 |
| 2002/0176004 A1* | 11/2002 | Shinada | H04N 5/2252 | 348/207.99 |
| 2003/0011498 A1* | 1/2003 | Oliveira | G10H 1/0058 | 341/139 |
| 2003/0151663 A1* | 8/2003 | Lorenzetti | H04N 7/18 | 348/148 |
| 2003/0169886 A1* | 9/2003 | Boyce | H04R 5/027 | 381/1 |
| 2004/0136549 A1* | 7/2004 | Pennock | G10H 1/02 | 381/119 |
| 2004/0182228 A1* | 9/2004 | Brett | G10H 1/0008 | 84/612 |
| 2004/0199276 A1* | 10/2004 | Poon | G11B 20/10527 | 700/94 |
| 2005/0053352 A1* | 3/2005 | McKain | G11B 27/034 | 386/241 |
| 2005/0094744 A1* | 5/2005 | Ramachandran | H03D 3/00 | 375/316 |
| 2005/0126369 A1* | 6/2005 | Kirkeby | G10H 1/00 | 84/615 |
| 2006/0083387 A1* | 4/2006 | Emoto | H04R 1/1083 | 381/73.1 |
| 2006/0153399 A1* | 7/2006 | Davis, Jr. | H04R 5/027 | 381/92 |
| 2006/0225554 A1* | 10/2006 | Price, Jr. | G11B 27/034 | 84/1 |
| 2006/0251381 A1* | 11/2006 | Wickstead | G11B 20/00007 | 386/235 |
| 2006/0273914 A1* | 12/2006 | Carreras | G10L 21/0208 | 340/573.1 |
| 2007/0047901 A1* | 3/2007 | Ando | G11B 20/10527 | 386/241 |
| 2007/0058937 A1* | 3/2007 | Ando | G11B 27/105 | 386/248 |
| 2007/0061142 A1* | 3/2007 | Hernandez-Abrego | G10L 17/04 | 704/247 |
| 2007/0102764 A1* | 5/2007 | Ando | G11B 20/00086 | 257/355 |
| 2007/0166671 A1* | 7/2007 | Walter | G09B 5/00 | 434/98 |
| 2007/0177466 A1* | 8/2007 | Ando | G11B 27/105 | 369/13.01 |
| 2007/0226734 A1* | 9/2007 | Lin | G06F 9/44526 | 717/177 |
| 2007/0238082 A1* | 10/2007 | Ingrassia | G09B 5/04 | 434/307 A |
| 2007/0242137 A1* | 10/2007 | McKain | G03B 17/02 | 348/207.99 |
| 2007/0245375 A1* | 10/2007 | Tian | G10H 1/0041 | 725/45 |
| 2007/0283048 A1 | 12/2007 | Theimer et al. | | 709/246 |
| 2008/0120114 A1* | 5/2008 | Ojanpera | G10L 19/173 | 704/278 |
| 2008/0133230 A1* | 6/2008 | Herforth | G01C 21/26 | 704/235 |
| 2008/0188967 A1* | 8/2008 | Taub | G10H 1/00 | 700/94 |
| 2008/0250328 A1* | 10/2008 | Konttinen | G06F 17/30035 | 715/747 |
| 2008/0254881 A1* | 10/2008 | Lutnick | G07F 17/32 | 463/31 |
| 2009/0017878 A1* | 1/2009 | Romesburg | H04M 1/03 | 455/570 |
| 2009/0019492 A1 | 1/2009 | Grasset | | 725/45 |
| 2009/0022332 A1* | 1/2009 | Van Schaack | G06F 3/03545 | 381/71.1 |
| 2009/0027338 A1* | 1/2009 | Weinberg | G06F 3/017 | 345/158 |
| 2009/0061974 A1* | 3/2009 | Lutnick | G07F 17/32 | 463/13 |
| 2009/0067641 A1* | 3/2009 | Lengeling | G10H 1/20 | 381/80 |
| 2009/0088247 A1* | 4/2009 | Oberg | A63F 13/12 | 463/35 |
| 2009/0093300 A1* | 4/2009 | Lutnick | G07F 17/32 | 463/26 |
| 2009/0144325 A1* | 6/2009 | Chastagnol | G06Q 30/06 | |
| 2009/0204413 A1* | 8/2009 | Sintes | G10L 19/16 | 704/500 |
| 2009/0265022 A1* | 10/2009 | Kirovski | H04M 1/72522 | 700/94 |
| 2009/0303350 A1 | 12/2009 | Terada | | |
| 2009/0304197 A1* | 12/2009 | Joiner | H04M 3/56 | 381/66 |
| 2009/0304206 A1* | 12/2009 | Joiner | H04M 3/56 | 381/119 |
| 2010/0017205 A1* | 1/2010 | Visser | G10L 19/00 | 704/225 |
| 2010/0048302 A1* | 2/2010 | Lutnick | G07F 17/32 | 463/42 |
| 2010/0057228 A1* | 3/2010 | Kong | G10L 19/02 | 700/94 |
| 2010/0076576 A1* | 3/2010 | Lee | H04L 65/4076 | 700/94 |
| 2010/0112939 A1* | 5/2010 | Chang | G07C 5/0891 | 455/26.1 |
| 2010/0130236 A1* | 5/2010 | Sivadas | H04W 4/02 | 455/456.6 |
| 2010/0142725 A1* | 6/2010 | Goldstein | H04R 29/00 | 381/92 |
| 2010/0151946 A1* | 6/2010 | Wilson | G06F 3/017 | 463/36 |
| 2010/0195841 A1* | 8/2010 | Pires | H04R 27/00 | 381/61 |
| 2010/0218097 A1* | 8/2010 | Herberger | G11B 27/034 | 715/716 |
| 2010/0227643 A1* | 9/2010 | Yew | H04M 1/72527 | 455/557 |
| 2010/0241845 A1* | 9/2010 | Alonso | H04L 9/3231 | 713/150 |
| 2010/0296668 A1* | 11/2010 | Lee | G10K 11/1784 | 381/94.7 |
| 2010/0300264 A1* | 12/2010 | Foster | G10H 1/0058 | 84/610 |
| 2011/0011243 A1* | 1/2011 | Homburg | G10H 1/0066 | 84/612 |
| 2011/0011244 A1* | 1/2011 | Homburg | G10H 1/0066 | 84/612 |
| 2011/0011245 A1* | 1/2011 | Adam | G10H 1/0066 | 84/612 |
| 2011/0011246 A1* | 1/2011 | Buskies | G10H 1/0066 | 84/613 |
| 2011/0015766 A1* | 1/2011 | Gehring | G10H 1/0066 | 700/94 |
| 2011/0015767 A1* | 1/2011 | Homburg | G10H 1/0066 | 700/94 |
| 2011/0016393 A1* | 1/2011 | Gerteis | G06F 12/023 | 715/716 |

(56) References Cited

U.S. PATENT DOCUMENTS

| | | | |
|---|---|---|---|
| 2011/0016397 A1* | 1/2011 | Sapp | G06F 3/04815 715/728 |
| 2011/0054647 A1* | 3/2011 | Chipchase | H04M 3/42127 700/94 |
| 2011/0054907 A1* | 3/2011 | Chipchase | H04M 1/6066 704/275 |
| 2011/0058052 A1* | 3/2011 | Bolton | H04M 1/7253 348/211.99 |
| 2011/0065490 A1* | 3/2011 | Lutnick | G07F 17/32 463/16 |
| 2011/0066941 A1* | 3/2011 | Chipchase | G06F 3/167 715/716 |
| 2011/0112913 A1* | 5/2011 | Murray | G06Q 30/00 705/14.73 |
| 2011/0161085 A1* | 6/2011 | Boda | G06Q 30/02 704/260 |
| 2011/0235816 A1* | 9/2011 | Bouhraoua | A61F 11/08 381/172 |
| 2011/0255842 A1* | 10/2011 | Hindle | G11B 27/105 386/262 |
| 2011/0275432 A1* | 11/2011 | Lutnick | G07F 17/3232 463/25 |
| 2011/0293103 A1* | 12/2011 | Park | G10K 11/1782 381/57 |
| 2012/0050570 A1* | 3/2012 | Jasinski | G11B 27/28 348/231.4 |
| 2012/0051561 A1* | 3/2012 | Cohen | G10L 21/00 381/122 |
| 2012/0063617 A1* | 3/2012 | Ramos | G11B 20/00826 381/119 |
| 2012/0084131 A1* | 4/2012 | Bergel | G06F 17/30876 705/14.26 |
| 2012/0101747 A1* | 4/2012 | Kielkopf | G01M 3/002 702/51 |
| 2012/0116184 A1* | 5/2012 | Shieh | A61B 5/01 600/301 |
| 2012/0121096 A1* | 5/2012 | Chen | G10L 21/0364 381/57 |
| 2012/0124456 A1* | 5/2012 | Perez | G06Q 30/02 715/200 |
| 2012/0154632 A1* | 6/2012 | Ota | G10L 21/028 348/231.4 |
| 2012/0179279 A1* | 7/2012 | Guetta | G11B 20/10527 700/94 |
| 2012/0183156 A1* | 7/2012 | Schlessinger | G06F 3/165 381/111 |
| 2012/0207308 A1* | 8/2012 | Sung | H04S 7/304 381/17 |
| 2012/0209413 A1* | 8/2012 | Xu | H04N 21/233 700/94 |
| 2012/0214587 A1* | 8/2012 | Segal | A63F 13/428 463/30 |
| 2012/0215519 A1* | 8/2012 | Park | G06F 17/289 704/2 |
| 2012/0242599 A1* | 9/2012 | Seo | G06F 1/1641 345/173 |
| 2012/0245933 A1* | 9/2012 | Flaks | G10L 21/0208 704/233 |
| 2012/0263317 A1* | 10/2012 | Shin | G10L 21/0224 381/94.7 |
| 2012/0294457 A1* | 11/2012 | Chapman | G10H 1/0091 381/98 |
| 2012/0300961 A1* | 11/2012 | Moeller | H04R 3/00 381/122 |
| 2012/0307048 A1* | 12/2012 | Abrahamsson | H04S 5/005 348/142 |
| 2012/0308025 A1* | 12/2012 | Hendrix | G10K 11/17885 381/71.11 |
| 2012/0308026 A1* | 12/2012 | Kamath | G10K 11/1784 381/71.11 |
| 2012/0321112 A1* | 12/2012 | Schubert | H04R 25/43 381/312 |
| 2013/0003962 A1* | 1/2013 | Ballagas | H04M 9/082 379/406.06 |
| 2013/0007043 A1* | 1/2013 | Phillips | G06F 17/30038 707/769 |
| 2013/0051207 A1* | 2/2013 | Yoshinari | H04S 7/30 381/119 |
| 2013/0078149 A1* | 3/2013 | Holmes | B04B 5/0414 422/72 |
| 2013/0078624 A1* | 3/2013 | Holmes | C12Q 1/00 435/6.11 |
| 2013/0078733 A1* | 3/2013 | Holmes | B01L 3/0217 436/174 |
| 2013/0079236 A1* | 3/2013 | Holmes | G01N 33/50 506/9 |
| 2013/0148826 A1* | 6/2013 | Chung | H03G 3/20 381/107 |
| 2013/0202114 A1* | 8/2013 | Tammi | H04R 1/406 381/1 |
| 2013/0226489 A1* | 8/2013 | Sogl | H04L 27/368 702/69 |
| 2013/0236040 A1* | 9/2013 | Crawford | H04S 7/304 381/310 |
| 2013/0268357 A1* | 10/2013 | Heath | H04L 63/00 705/14.53 |
| 2013/0283318 A1* | 10/2013 | Wannamaker | H04H 20/30 725/56 |
| 2013/0315402 A1* | 11/2013 | Visser | G10L 19/00 381/18 |
| 2013/0315404 A1* | 11/2013 | Goldfeder | H04R 3/005 381/58 |
| 2014/0029395 A1* | 1/2014 | Bolas | G09B 15/00 369/4 |
| 2014/0071342 A1* | 3/2014 | Winograd | H04N 5/44 348/383 |
| 2014/0105411 A1* | 4/2014 | Santos | G10H 1/361 381/66 |
| 2014/0193019 A1* | 7/2014 | Yan | H04R 1/30 381/342 |
| 2014/0370958 A1* | 12/2014 | Lutnick | G07F 17/3276 463/17 |
| 2015/0117155 A1* | 4/2015 | Jang | G10K 15/02 367/135 |

FOREIGN PATENT DOCUMENTS

| | | |
|---|---|---|
| EP | 0877371 A1 | 11/1998 |
| EP | 1439650 A1 | 7/2004 |
| EP | 1780710 A1 | 5/2007 |
| JP | 2000/156039 A * | 6/2000 |

* cited by examiner

RECORDING RESOLUTION
AUDIO TRACK 1
    DYNAMIC RANGE
        ● 16 BITS(xxx dB)
        ○ 20 BITS(yyy dB)
        ○ 24 BITS(zzz dB)
    SAMPLE RATE
        ● 48 kHz
        ◎ 96 kHz
        ◎ 192 kHz
AUDIO TRACK 2
    DYNAMIC RANGE
        ◎ 16 BITS(xxx dB)
        ● 20 BITS(yyy dB)
        ◎ 24 BITS(zzz dB)
    SAMPLE RATE
        ◎ 48 kHz
        ● 96 kHz
        ◎ 192 kHz

FIG.5

MULTI-RESOLUTION AUDIO SIGNALS

BACKGROUND

Technical Field

The exemplary and non-limiting embodiments relate generally to multi-resolution audio signals and, more particularly, to audio signals where the audio signals have different audio resolutions.

Brief Description of Prior Developments

In some devices, such as a conventional smartphone for example, audio recording settings are fixed. Thus, audio resolution (sampling rate and dynamic range) of recorded audio is fixed. In this type of conventional smartphone, playing of audio signals is limited to the same resolution as the recording resolution, such as only 16 bit dynamic range and 48 kHz sample rate.

SUMMARY

The following summary is merely intended to be exemplary. The summary is not intended to limit the scope of the claims.

In accordance with one aspect, an apparatus comprises at least one microphone; audio circuitry connected to the at least one microphone; and a memory connected to the audio circuitry. The audio circuitry is configured to output a first audio track and at least one second audio track. The audio circuitry is configured to form the first audio track from an output signal, provided by the at least one microphone, by processing the output signal with a first audio configuring, and where the audio circuitry is configured to form the at least one second audio track from the output signal, provided by the at least one microphone, without the first audio configuring. The memory is configured to store the first audio track and the at least one second audio track together.

In accordance with another aspect, a method comprises recording a first audio track on a memory, where the first audio track comprises an output signal provided by a microphone which has been processed with a first audio configuring; and recording at least one second audio track on the memory with the first audio track, where the at least one second audio track comprises the output signal provided by the microphone which has not been processed with the first audio configuring.

In accordance with another aspect, a non-transitory program storage device readable by a machine is provided, tangibly embodying a program of instructions executable by the machine for performing operations, the operations comprising recording a first audio track on a memory, where the first audio track comprises an output signal provided by a microphone which has been processed with a first audio configuring; and recording at least one second audio track on the memory with the first audio track, where the second audio track comprise the output signal provided by the microphone which has not been processed with the first audio configuring.

In accordance with another aspect, an apparatus comprises a player configured to play sound from an audio track; and a selector configured to select the audio track to be played by the player from a plurality of audio tracks of a same recorded sound. Each of the plurality of audio tracks has a different audio configuring of the same recorded sound, where the selector is configured to select the audio track to be played based, at least partially, upon an ability of the player to properly play the audio configuring of the audio track.

In accordance with another aspect, a non-transitory memory device comprises a first audio track having a first output signal, provided by at least one microphone, which has been processed with a first audio configuring to thereby have a first audio configuration; and a second audio track in a same file as the first audio track, where the second audio track has a second output signal, provided by the at least one microphone, which has not been processed with the first audio configuring to thereby have a second different audio configuration.

BRIEF DESCRIPTION OF THE DRAWINGS

The foregoing aspects and other features are explained in the following description, taken in connection with the accompanying drawings, wherein:

FIG. 5 is a diagram illustrating a user interface in an example embodiment;

DETAILED DESCRIPTION OF EMBODIMENTS

Figure 1:
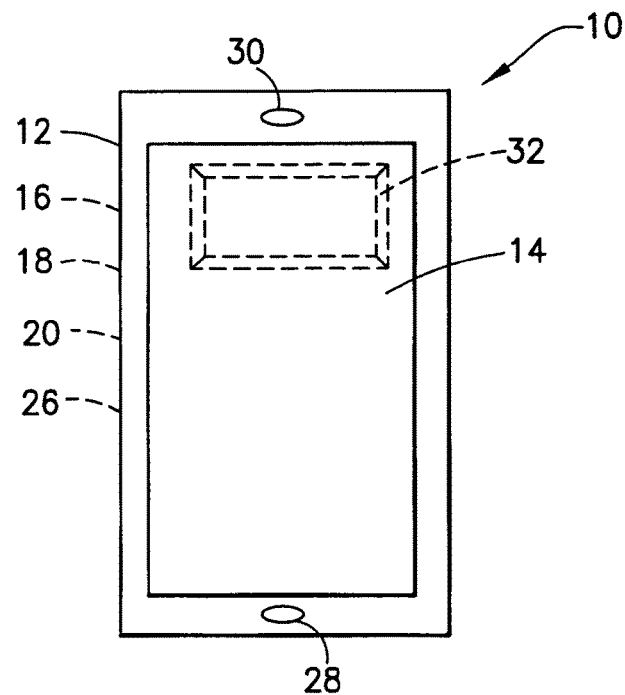
FIG. 1 is a front view of an example embodiment of an apparatus.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 2:
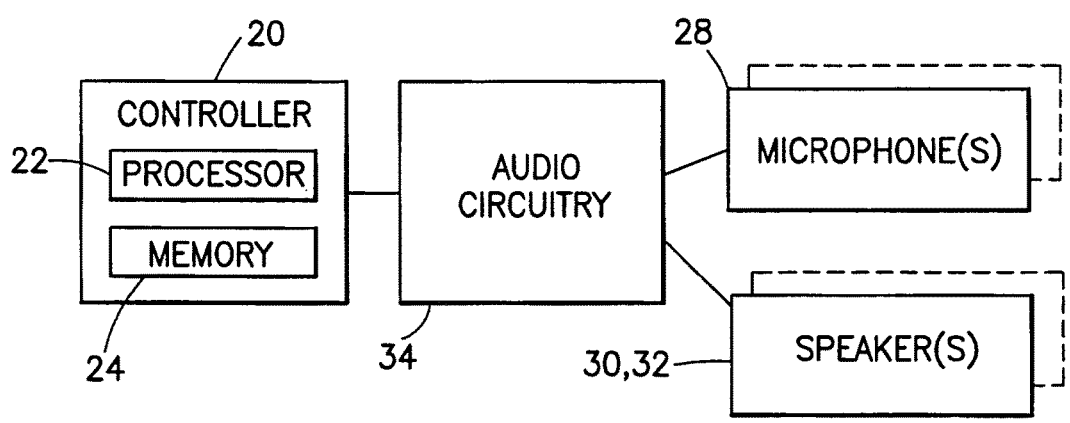
FIG. 2 is a diagram illustrating some of the components of the apparatus shown in FIG. 1.

The apparatus 10 may be a hand-held communications device which includes a telephone application, such as a smartphone for example. The apparatus 10 may also comprise an Internet browser application, camera application, video recorder application, music player and recorder application, email application, navigation application, gaming application, and/or any other suitable electronic device application. Referring to both FIGS. 1 and 2, the apparatus 10, in this example embodiment, comprises a housing 12, a display 14, a receiver 16, a transmitter 18, a rechargeable battery 26, and a controller 20. The receiver 16 and transmitter 18 form a wireless mobile communication interface to allow the apparatus 10 to communicate with a wireless telephone system, such as a mobile telephone base station for example. As seen in FIG. 2, the controller 20 may include at least one processor 22, at least one memory 24, and software. However, all of these features are not necessary to implement the features described below. It is also noted that features as described herein are not limited to wireless telephone systems. For example, features as described may be used with a video camera or a non-wireless audio recorder or player.

The display 14 in this example may be a touch screen display which functions as both a display screen and as a user input. However, features described herein may be used in a display which does not have a touch, user input feature. The user interface may also include a keypad (not shown). The electronic circuitry inside the housing 12 may comprise a printed wiring board (PWB) having components such as the controller 20 thereon.

Figure 3:
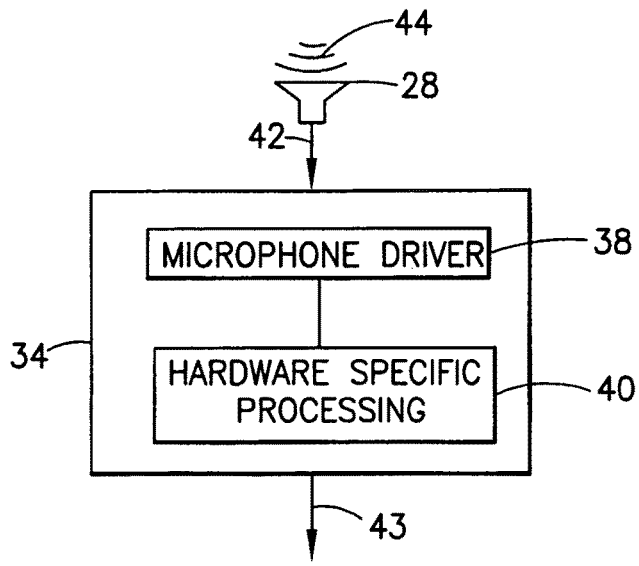
FIG. 3 is a diagram illustrating some of the components of the audio circuitry.

The circuitry includes at least one microphone(s) 28, an earpiece speaker 30, and perhaps also a sound speaker 32, such as at the rear side of the apparatus 10. As shown in FIG. 2, the circuitry includes audio circuitry 34 which is connected to the microphone(s) 28 and the speaker(s) 30, 32. Referring also to FIG. 3, the microphone 28, in this example, comprises a sound transducer which produces an audio signal 42 based upon incoming sound 44. The audio circuitry includes a microphone driver 38, and circuitry for hardware specific processing 40. In this non-limiting example the microphone driver is the hardware driver for the microphone(s), usually consisting of a digital decimator for digital microphones and outputting a Pulse Code Modulation (PCM) word of desired accuracy (such as 16-bit or 20-bit or 24-bit for example) into a hardware buffer(s), which is read by associated driver software. The hardware specific microphone processing may do purely hardware specific processing such as, for example, a microphone equalizer to ensure that the frequency response of the microphone(s) is as flat as possible with the product acoustics.

Figure 4:
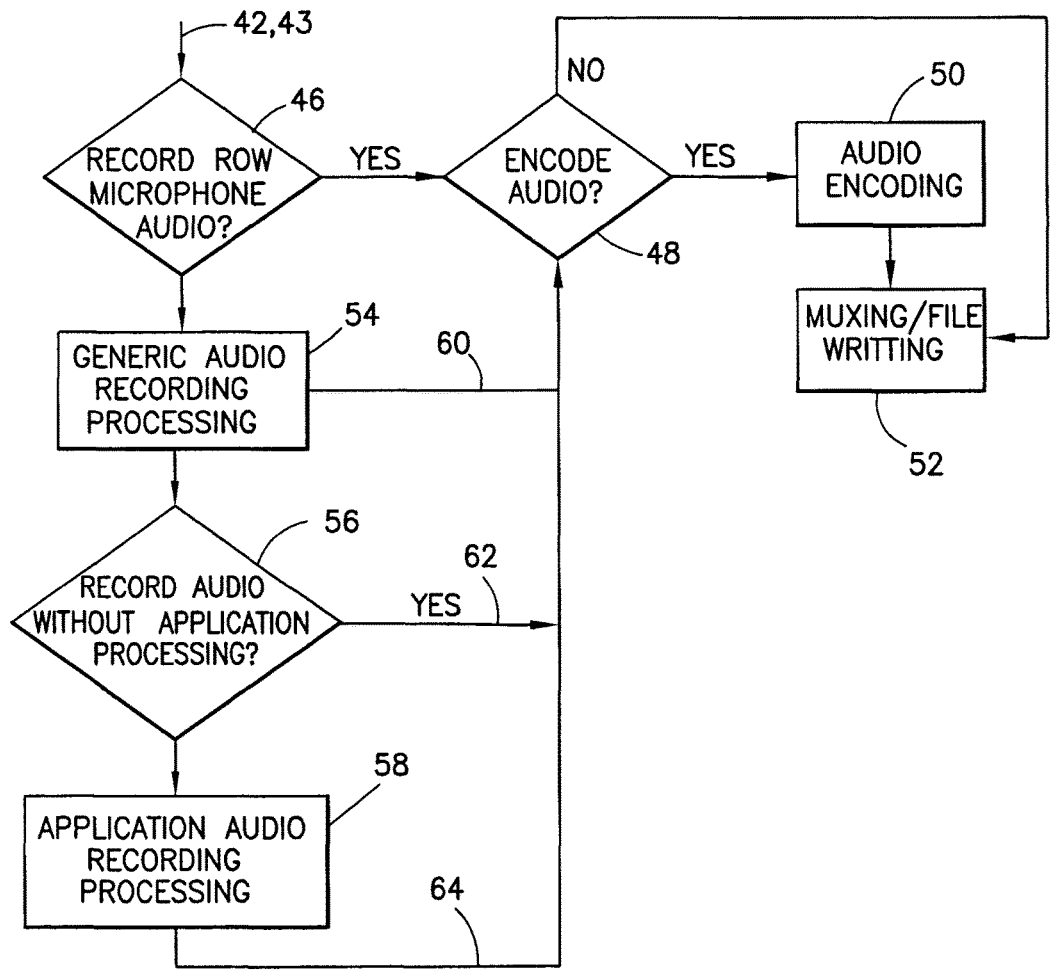
FIG. 4 is a diagram illustrating some method steps in an example embodiment.

Referring now also to FIG. 4, the circuitry and software are adapted to perform hardware independent processing of the audio signal 42 or 43 from the microphone(s) 28 (or on the signal after processing by the microphone driver 38 or hardware processing 40). In this non-limiting example, the apparatus may be programmed to determined if raw microphone audio 42 is to be recorded as indicated by block 46. If YES, the apparatus may be programmed to determined if the raw microphone audio signal 42 should be encoded as indicated by block 48. The audio encoding 50 may comprise, for example, AAC, WMA, MP3, FLAC, and/or Dolby Digital Plus. The apparatus may be programmed to perform Muxing or file writing as indicated by block 52, to the memory 24 for example or another recordable medium. File writing and possible muxing do writing of the data to a file (in case of muxing together with no-audio data such as video and/or combining multiple audio signals into a single container).

In addition to possibly recording the raw microphone audio, the apparatus may be programmed to perform generic audio recording processing as indicated by block 54. For example, generic audio recording processing may comprise quality improvements such as wind noise reduction or other noise reduction, such as microphone self-noise reduction.

In addition to possibly performing generic audio recording processing 54, the apparatus may be programmed to determine, as indicated by block 56, if the audio is to be recorded before possible application audio recording processing as indicated by block 58. If YES, the apparatus may be programmed to determined if the audio signal after generic audio recording processing 54 should be encoded as indicated by block 48.

If the audio is to be recorded with possible application audio recording processing as indicated by block 58, the application audio recording processing may use case specific processing such as upmixing or audio zooming for example. The apparatus may be programmed to determined if the audio signal after application audio recording processing 58 should be encoded as indicated by block 48.

With features as described herein, more than one variations of an audio signal (as identified before any possible encoding 50) may be recorded together in a common file, perhaps as separate audio tracks. In the example shown, five possible variations include:

Pure microphone data 42. Non-processed microphone data is recorded.

Raw audio data 43. No other processing other than microphone hardware specific processing is done (e.g. microphone equalizer).

Data 60 after minimalistic processing in 54. This includes generic processing that most users would want to be done such as wind noise reduction for example.

Data 62 after quality improvements from 56. This includes further quality related processing such as street noise reduction has been done.

Data 64 after application processing from 58. This includes application related processing such as, for example, upmixing to 5.1 has been done.

Audio resolution, as used herein, refers to the dynamic range and sample rate (frequency range) of an audio signal. Dynamic range refers to a difference between the quietest and loudest audio. Conventional microphones can record about 87 dB dynamic range (microphone self-noise limits to 33 dB SPL and distortion limits to 120 dB SPL) for which 16-bit audio, corresponding to 96 dB dynamic range, is adequate. It is believed that the audio recording path in most smartphones using conventional microphones is targeted for 16-bit dynamics.

However, newer microphone technology that is already in use in certain devices, have lower self-noise (such as 27 dB SPL for example) and the ability to have high amplitude audio capture such as at 140 dB, thus having an expanded dynamic range of 113 dB. With the new microphone technology, to capture the whole dynamic range, arithmetics larger than 16-bit is needed. In some smartphones using the newer microphone technology, software processing is used on the dynamics to compress the dynamic range to 16 bits to better match normal listening room conditions.

Features as described herein allow multiple audio tracks to be recorded with different resolution settings of dynamic range and/or frequency range to a same file. Also, audio data may be taken from different places in the audio capture processing chain (see FIG. 4). Also, different tracks can be encoded with different audio codecs or not coded at all (i.e. raw audio data capture).

Benefits include that one track would be suitable for all rendering devices and would utilize conventional settings. Other track(s) would use higher ranges and could be used by more advanced applications or rendering devices.

The audio recording path in a conventional recording device, such as a smartphone for example, has been designed so that it suites the needs of normal everyday usage. Frequency range is (almost) good enough for sounds that are heard by human ear in the first place. Also dynamic range captures (almost) everything that people would find useful. However, there is information beyond the conventional 24 kHz frequency range (48 kHz sample rate) and conventional 16-bit dynamic range. Thus, use of the new microphone technology is now desirable. However, audio recording are commonly used or shared on multiple different devices. For example, a first person might want to share an audio/video file taken with a smartphone with a second person's smartphone. If the first person's smartphone records the audio/video file at an audio resolution larger than 48 kHz sample rate and 16-bit dynamic range using the new microphone technology, and if the second person's smart phone is older and does not have the capability to play audio having a resolution larger than 48 kHz sample rate and 16-bit dynamic range, the audio component of the file cannot be played by the second person's smartphone.

High quality audio recording uses 48 kHz sampling rate to ensure the whole human audible frequency range from 20 Hz to 20 kHz can be captured. According to Nyquist sampling theorem, it is possible to capture half of the sampling rate accurately, but this presumes a brick-wall low-pass filter at the sampling frequency. With 48 kHz, the 20 kHz is well captured and the LP-filter can be more relaxed.

Analog-to-digital and digital-to-analog converter chips are now available with higher sampling rates, such as 96 kHz and 192 kHz. These high sampling rates do capture content higher than it is possible for a human to hear. But there are some claims that e.g. the high-energy transients are better captured with higher than Nyquist sampling rates.

In the example shown in FIG. 1, the apparatus 10 is configured to allow the user to select audio resolution for at least one track of the recorded sound by use of the user input touch screen 14. FIG. 5 shows a portion of an example user interface. In this example, there are settings for multiple tracks (only two are fully visible in this example). For each track the user can select the dynamic range and sample rate. Realistic values of 16, 20 and 24 bits and 48, 96 and 192 kHz have been selected, but features as describe herein are not limit to these.

When it comes to dynamic range, the user interface (UI) can show the values also in decibels indicating either the theoretical maximum of that word length or what the real dynamic range would be with the microphones used in that specific product. A similar approach may be used for the sample rate.

The apparatus 10 is configured to take a high resolution audio signal from the microphone(s) 28 and lower the resolution to a lower resolution audio signal. The apparatus 10 may use, for example, downsampling of the sample rate and/or dynamic range lowering such as using compression for example. Different example embodiments and methods may be configured to perform this resolution lowering function at any point along the audio signal chain between the microphone and the muxing/file writing. The apparatus may be configured to record a higher resolution audio signal and a lower resolution audio signal of a same sound from a same microphone in one file (perhaps as different tracks). The apparatus may be configured to record a higher resolution audio signal and a lower resolution audio signal of different sounds from respective different microphones in one file (perhaps as different tracks) or perhaps in different files. The apparatus may be configured to record a higher resolution audio signal and a lower resolution audio signal of different sounds from a same microphone in one file (perhaps as different tracks) or perhaps in different files. One example is audio zooming using different parameters, but still using the same microphone(s).

Figure 6:
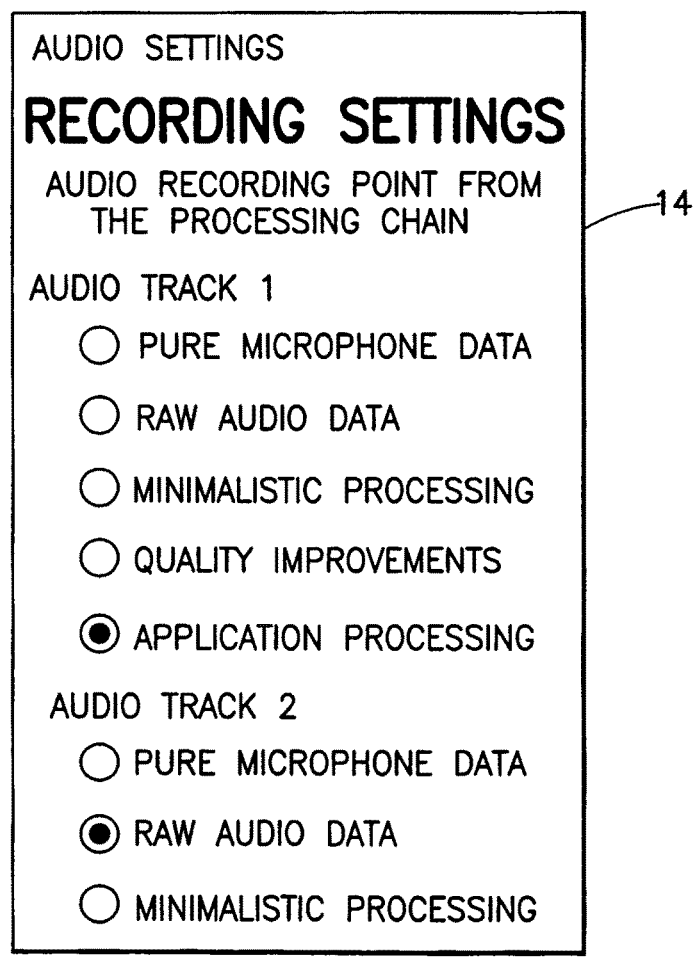
FIG. 6 is a diagram illustrating a user interface in an example embodiment.

FIG. 6 shows a portion of an example user interface to enable a user to select additional recording settings. There are settings for multiple tracks (only the first one is fully visible). For each track the user may select the point in the recording processing chain from where audio will be recorded. The points and their terminology are examples only. Here they represent the following:

Pure microphone data means that non-processed microphone data is recorded.

Raw audio data means that no other processing than microphone HW specific processing is done e.g. microphone equalizer.

Minimalistic processing means that also generic processing that most users would want to be done like wind noise reduction is done.

Quality improvements means that further quality related processing like street noise reduction is done.

Application processing means that application related processing like upmixing to 5.1 is done.

Figure 7:
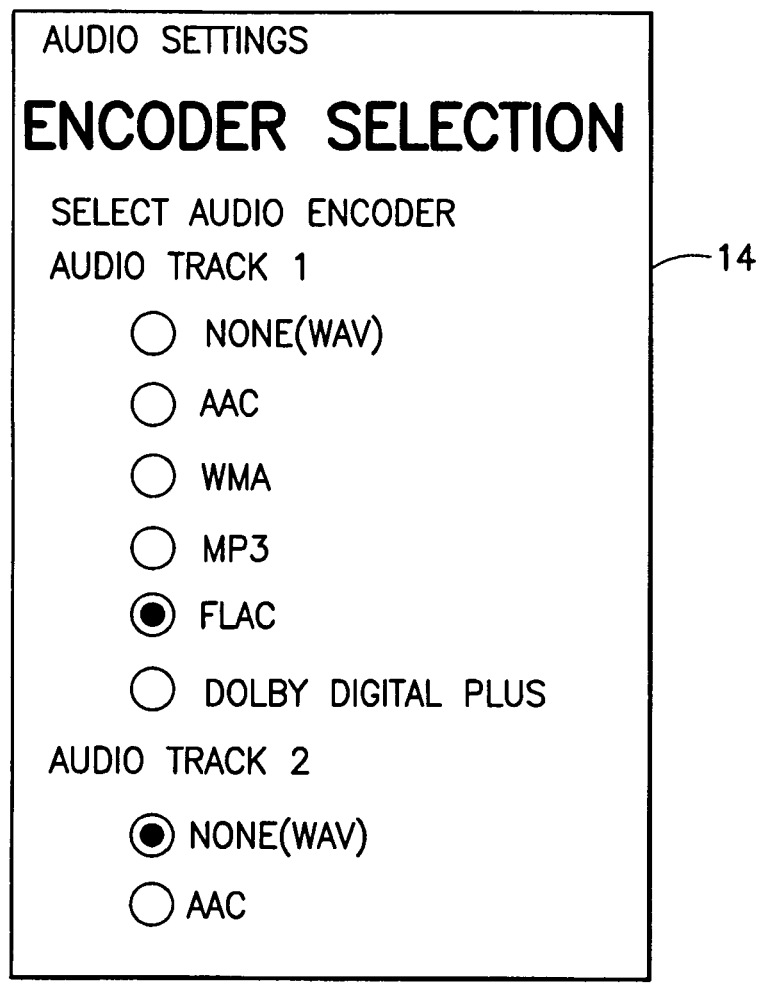
FIG. 7 is a diagram illustrating a user interface in an example embodiment.

FIG. 7 shows a portion of an example user interface to enable a user to select additional recording settings. There are settings for multiple tracks (only the first one is fully visible). For each track the user may select the used encoder.

Examples of use cases for non-conventional dynamic range include:
  20-bit: e.g. 4-bit headroom for 3rd party audio application processing related to e.g. equalization or dynamics compression
  24-bit: super quality audio compatible with expensive high-end home audio reproduction systems. Accurate representation for measurement applications, such as a dB-meter or a frequency analyzer.

Examples of use cases for non-conventional frequency range include:
  96 kHz sample rate: One can record what dogs hear and also decimate that to audible frequencies.
  192 kHz sample rate: One can record most of what bats emit and also decimate that to audible frequencies.

With features as described herein, a new use case for higher sampling rates is ultrasonic audio, which could be used e.g. to capture a pen movement or unaudible animal sounds.

Figure 9:
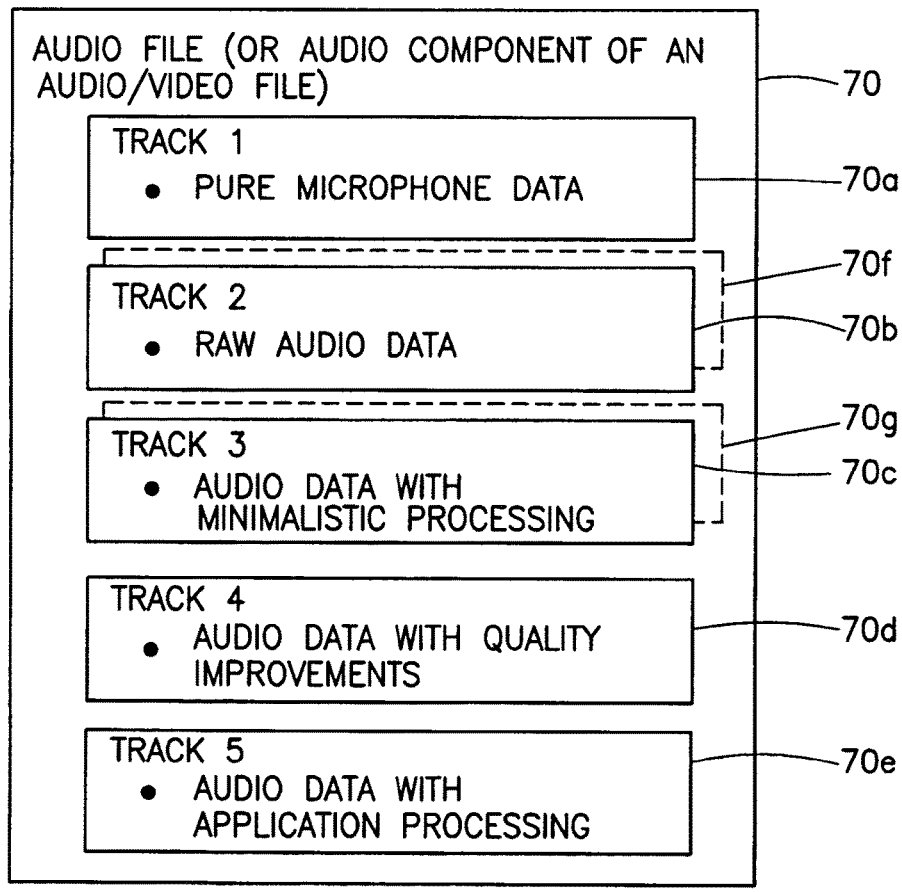
FIG. 9 is a diagram illustrating one type of example of an electronic file having tracks with different audio resolution of a same sound recording.

FIG. 9 shows one example embodiment of an audio file (or audio component of an audio/video file) 70 with multiple tracks 70a-70g where each track is made from the same sound 44 received at the microphone(s) but each has a different audio resolution. Of course, in an alternate example more or less than 5 tracks could be provided. The player, such as in apparatus 10 or another apparatus, which plays the audio file 70 can be configured to automatically play the track 70a or 70b or 70c or 70d or 70e which the player is most compatable with. Alternatively, or additionally, the player may allow the user to select the track 70a-70e which the user wants to play. One or more of the tracks may have a signal which has been downsampled and/or dynamic range lowered, and/or different encoding as indicated by 70f and 70g.

Features of the example embodiment relate to recording audio with higher than conventional sample rate and dynamic range (i.e. higher than 48 kHz sample rate and 16-bit word length). At least two audio tracks may be recorded into one container/file. A first one of the tracks may follow the current de facto parameters for good audio recording (i.e. 48 kHz sample rate and 16-bit word length). In an alternate example, the first track might not follow the current de facto parameters. The other track(s) may have a relatively bigger sample rate and/or a bigger dynamic range (i.e. bigger than the conventional 48 kHz sample rate and 16-bit word length). The rendering device may then render the best quality track it can (the first track or one of the other tracks). The default track would in practice be the one with conventional quality settings (i.e. 48 kHz sample rate and 16-bit word length). In an alternate example embodiment the default track might not be the first track in the container (e.g., MP4).

In one type of example, a non-transitory memory device, such as memory 24 or medium 98 (see FIG. 10) for example, may comprise a first audio track (70g) having a first output signal, provided by at least one microphone, which has been processed with a first downsampling and/or range lowering to thereby have a first audio resolution; and a second audio track (70c) in a same file (70) as the first audio track, where the second audio track has a the first output signal or a different second output signal, provided by the at least one microphone, which has not been processed with the first downsampling and/or range lowering to thereby have a second different audio resolution.

Figure 10:
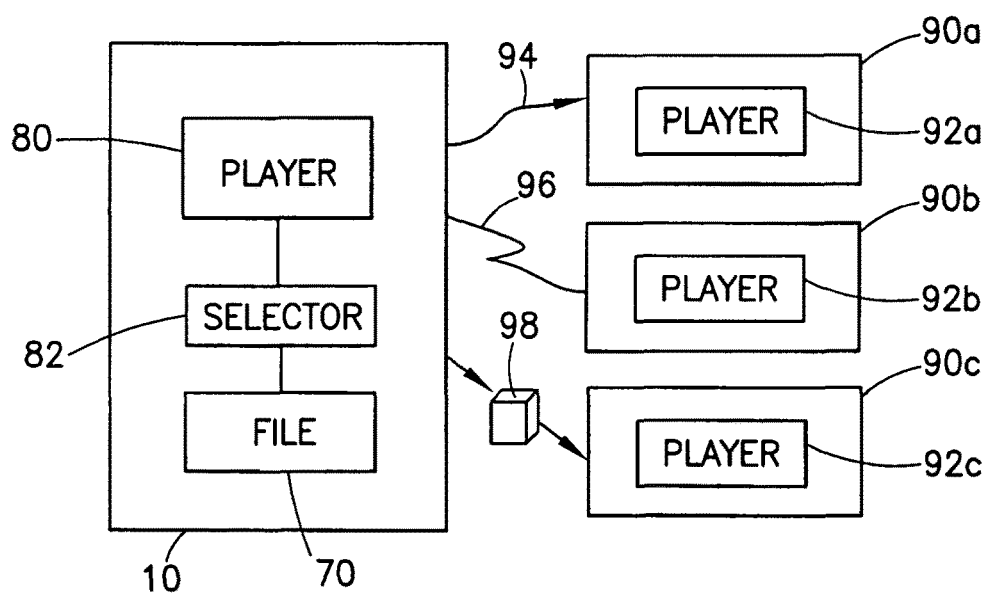
FIG. 10 is a diagram illustrating how the file of FIG. 9 may be used with different devices having players with different audio resolution playing capabilities.

Referring also to FIG. 10, the apparatus 10 has a player 80 for playing audio, such as including the speaker(s) 30, 32. In a first example the player 80 has limitations regarding how high an audio resolution can be played. In this first example it may be able to play only a limited audio resolution of 48 kHz sample rate and 16-bit dynamic range. The apparatus 10 includes a selector 82, such as part of the controller 20, which is configured to automatically select the audio track to be played by the player 80 from a plurality of audio tracks (such as 70a, or 70b, or 70c, or 70d, or 70e, or 70f, or 70 g, etc. for example) of a same recorded sound. The selection may be based upon the audio resolution playing capability of the player 80.

In this first example, even though the player 80 of the apparatus 10 cannot play the higher audio resolution tracks in the file 70, the apparatus is still able to record the file 70 with one or more tracks having an audio resolution higher than the audio resolution playing capability of the player 80 (48 kHz sample rate and 16-bit dynamic range).

The file 70 may be shared with other devices 90a, 90b, 90c, such as via links 94, 96, 98. Thus, audio tracks captured by the apparatus 10 may be rendered by another apparatus. In one use case, the whole media container may be sent. For example, a media container may be sent over a wireless DLNA to a home theater system (the home theater system being one of the devices 90a, 90b, 90c for example) and rendered by the home theater system. The links may comprise, for example, an electrical conductor or cable 94, a wireless link 96, or a storage device or medium 98 for example. Thus, even though the player 80 of the apparatus 10 might not be able to play the higher audio resolution tracks, other devices might be able to do so.

In a second example, the player 80 is configured to play a higher audio resolution of 192 kHz sample rate or less and a 24-bit dynamic range or less. The player can, thus, play any one of the tracks 70a-70g. However, the player 92b of the device 90b is only able to play a limited audio resolution of 48 kHz sample rate and 16-bit dynamic range, and the player 92c of the device 90c is only able to play a limited audio resolution of 96 kHz sample rate or lower and a 20-bit dynamic range or lower. In this case, the same file 70 can still be used by any of the devices 10, 90a, 90b, 90c because the file 70 has different tracks of the same sound recording which has been recorded at the various different audio resolutions; where at least one of the tracts may be subsequently played by the devices.

In one example embodiment an apparatus 10 comprises at least one microphone 28; audio circuitry 34 connected to the at least one microphone, where the audio circuitry is configured to output a first audio track (42, 43, 60, 62, 64) and at least one second audio track (42, 43, 60, 62, 64), where the audio circuitry forms the first audio track from an output signal provided by the at least one microphone by downsampling and/or lowering a dynamic range of the output signal with a first downsampling and/or range lowering, such as to a 16-bit dynamic range, and where the at least one second audio track is formed from the output signal provided by the at least one microphone without the first downsampling and/or range lowering; and a memory connected to the audio circuitry which is configured to store the first audio track and the at least one second audio track together. "Together" may include a same file or different files, so long as they are in a same memory or a same storage device, such as a single memory or multiple memories in the apparatus or on another recording medium. The first and the second tracks do not need to be saved in same tracks following each other, and the first and second tracks do not need to be saved as parallel played tracks, such as stereo (i.e. one file comprising left and right channels). The tracks may be independently saved in a memory(ies) where each saved track may be independently selected/accessed later.

The apparatus may be configured to store the first audio track and the at least one second audio track in the memory in a common file. The first dynamic range lowering may lower the audio signal to a dynamic range of about 20 bits or 16 bits. The first downsampling may lower the audio signal to a sample rate of about 96 kHz or 48 kHz. The output signal from the microphone may be processed by the microphone with a microphone driver and hardware specific microphone processing. The audio circuitry 34 may comprise a processor and audio processing software. The audio circuitry may be configured to perform audio processing on the audio signal to form the first audio track comprising noise reduction, upmixing, audio zooming, and/or audio encoding. The audio circuitry may be configured to perform audio processing on the audio signal to form the at least one second audio track comprising noise reduction, upmixing, audio zooming, and/or audio encoding. The audio circuitry may be configured to form at least one of the second audio tracks without any compression or downsampling. The audio circuitry may be configured to form at least one of the second audio tracks with a second compression and/or downsampling which is different from the first compression and/or downsampling. The apparatus may further comprise a selector configured to automatically select one of the audio tracks to be played by the apparatus, where each of the plurality of audio tracks has a different audio resolution of a same recorded sound, where the selector is configured to automatically select the audio track to be played based upon an ability of the apparatus to properly play the audio resolution of the audio track.

Figure 8:
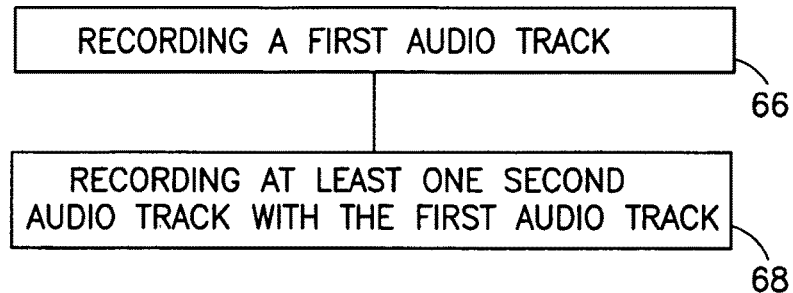
FIG. 8 is a diagram illustrating some steps of an example method.

Referring also to FIG. 8, an example method may comprise recording a first audio track on a memory as indicted by block 66, where the first audio track comprises an audio signal from a microphone which has been compressed with a first compression; and recording at least one second audio track on the memory with the first audio track as indicated by block 68, where the at least one second audio track comprises the audio signal from the microphone which has not been compressed with the first compression.

The method may comprise recording the first audio track and the at least one second audio track in the memory in a common file. The method may comprise compressing the audio signal to a dynamic range of about 20 bits or 16 bits as the first compression. The method may comprise compressing the audio signal to a sample rate of about 96 kHz or 48 kHz as the first compression. The method may comprise providing a user an ability to select audio resolution of the first audio track including dynamic range and sample rate. The method may comprise providing a user an ability to select audio resolution of at least one of the second audio tracks including dynamic range and sample rate of the at least one second audio track. The method may comprise a selector of an apparatus automatically select the audio track to be played by the apparatus from the audio tracks of a same recorded sound, where each of the audio tracks has a different audio resolution of the same recorded sound, where the selector automatically selects the audio track to be played based upon an ability of the apparatus to properly play the audio resolution of the audio track.

In one type of example embodiment a non-transitory program storage device readable by a machine, such as memory 24 for example, tangibly embodying a program of instructions executable by the machine for performing operations may be provided, where the operations comprise recording a first audio track on a memory, where the first audio track comprises an audio signal from a microphone which has been compressed with a first compression; and recording at least one second audio track on the memory with the first audio track, where the second audio track comprise the audio signal from the microphone which has not been compressed with the first compression.

In one type of example embodiment an apparatus comprises a player configured to play sound from an audio track; and a selector configured to automatically select the audio track to be played by the player from a plurality of audio tracks of a same recorded sound, where each of the plurality of audio tracks has a different audio resolution of the same recorded sound, where the selector is configured to automatically select the audio track to be played based upon an ability of the player to properly play the audio resolution of the audio track.

Features as described herein are not limited to smartphones. Features could, for example, be used in any suitable device having audio recording capability or audio file playing capability.

The description above sometimes refers to different compressions of the "same audio". However, in some example embodiments and methods different audio tracks of different resolution may have different audio sources. One example would be a zooming to a flying bat with high sample rate, and another audio track zooming to a speaking human object with de facto sample rate. Thus, features as described herein are not limited to "same audio".

The above description refers to functions being performed with the audio circuitry 34. It should be noted that the term "audio circuitry" is being used very broad here to include any type of electronics which processes an audio signal. Actual audio specific electronic hardware may output (or provide input) which other components may use to render the final maximum resolution and the lower resolution tracks such as made by a processor using software for example. Thus, the dynamic range handling and sample rate handling can be, at least partially, a hardware independent operation. "Audio circuitry" 34 shown in the drawings is intended to include both hardware and software processing of signals, so audio circuitry 34 may include 20 as a part of that circuitry.

The description above describes downsampling and/or dynamic range lowering for compression. However, there may be other means to select lower dynamics than traditional dynamic range compression (DRC). For example, a moving 16-bit window may be used within a 24-bit dynamic range where the 16-bit window is controlled by automatic volume controller. Features as described herein are not limited to traditional compression to select a lower dynamic audio signal from a high dynamic source.

In one type of example embodiment, the audio tracks with different resolutions may end up being in physically separate files. Features as described herein are not limited to having the audio tracks muxed into a single container. In such an example, there would still likely be some logical connection between the separate tracks, such as by means of file naming for example.

Features as described herein relate to capturing multiple audio tracks. Each track may have any sample rate, any word length, and/or be encoded by any codec. The tracks can also be in any order. Good examples are 48, 96 and 192 kHz for sample rate, and 16, 20 and 24 bits for word length, but features as described herein are not limited to these examples.

In one type of example, an apparatus 10 may be provided comprising at least one microphone; audio circuitry connected to the at least one microphone; and a memory. The audio circuitry may be configured to output a first audio track and at least one second different audio track. The audio circuitry may be configured to form the first audio track from an output signal, provided by the at least one microphone, by first audio resolution lowering with first audio resolution lowering settings. The audio resolution lowering may comprise downsampling of the output signal and/or lowering a dynamic range of the output signal. The lowering of the dynamic range of the output signal may comprise compression and/or a moving bit window used within a higher bit dynamic range controlled by an automatic controller for example, such as an automatic volume controller for example. The audio circuitry may be configured to form at least one of the second audio track(s) from the output signal, provided by the at least one microphone, without the first audio resolution lowering. The memory is connected to the audio circuitry which is configured to store the first audio track and the at least one second audio track together; perhaps in a same file.

In one example embodiment, an apparatus 10 comprises at least one microphone; audio circuitry connected to the at least one microphone; and a memory connected to the audio circuitry. The audio circuitry is configured to output a first audio track and at least one second audio track, where the audio circuitry is configured to form the first audio track from an output signal, provided by the at least one microphone, by audio configuring of the output signal with a first audio configuring, and where the audio circuitry is configured to form the at least one second audio track from the output signal, provided by the at least one microphone, without the first audio configuring. The memory is configured to store the first audio track and the at least one second audio track together.

The "audio configuring" may comprise configuring which changes the audio resolution of the output signal such as changing the sampling rate or changing the dynamic range. Changing the sampling rate may comprise, for example, downsampling or upsampling. Changing the dynamic range may comprise, for example, as lowering the range or increasing the range. Thus, upsampling and dynamic range increase are possible applications as well. Such configuring is computational only, but still applicable. An example would be always-on, low-power recording with lower sampling rate and dynamics, which would be upsampled and expanded to meet the de facto audio parameters (16-bit, 48 kHz). So, re-sampling to any arbitrary sample rate and compressing/expanding to any arbitrary dynamic range may be used.

The "audio configuring" may alternatively or additionally comprise audio processing such as described with reference to FIGS. 4, 6 and 7. The "audio configuring" may alternatively or additionally comprise encoding as described with reference to FIG. 4. It may be that downsampling or range lowering is not needed at all if that specific track records the best the HW can offer. Different audio tracks can have the same resolutions if they differ in some other ways; e.g. wind noise reduction enabled/disabled.

Thus, as used herein, a first audio configuring may comprise:
 a first audio resolution (increasing or decreasing sampling and/or dynamic range, or no changes to sampling and/or dynamic range) and/or
 a first audio processing (such as no audio processing, minimalistic processing, quality improvements or application processing for example) and/or
 a first encoding (such as no encoding, AAC, WMA, MP3, FLAC or Dolby Digital Plus for example),
and a second audio configuring may comprise:
 a different second audio resolution (increasing or decreasing sampling and/or dynamic range, or no changes to sampling and/or dynamic range) and/or
 a different second audio processing (such as no audio processing, minimalistic processing, quality improvements or application processing for example) and/or
 a different second encoding (such as no encoding, AAC, WMA, MP3, FLAC or Dolby Digital Plus for example).

However, in this example, the recording apparatus and method would provide at least two tracks recorded together, in a same file or separate files, from a sound(s) picked-up by a microphone(s) at about a same time, where the output provided by the microphone(s) has some type of different audio configuring for at least one of the tracks when recorded into the recording medium.

In one example embodiment the first audio configuring may compress the output signal to a dynamic range of about 20 bits or 16 bits. The first audio configuring may downsample the output signal to a sample rate of about 96 kHz or 48 kHz, for example, or upsample the output signal to a higher sample rate. The audio circuitry may be configured to perform the audio configuring on the output signal to form the first audio track comprising, for example, noise reduction, upmixing, audio zooming, and/or audio encoding. The audio circuitry may be configured to perform second different audio configuring on the output signal to form the at least one second audio track comprising, for example, noise reduction, upmixing, audio zooming, and/or audio encoding. The audio circuitry may be configured to form at least one of the second audio tracks with a second audio configuring comprising a second downsampling (or upsampling) and/or a second range lowering which is different from a first downsampling and/or a first range lowering provided by the first audio configuring. The audio circuitry is configured to form at least one of the second audio tracks with a second audio configuring comprising a second different resampling and/or a second range changing.

In another example, a method comprises recording a first audio track on a memory, where the first audio track comprises an output signal provided by a microphone which has been processed with a first audio configuring; and recording at least one second audio track on the memory with the first audio track, where the at least one second audio track comprises the output signal provided by the microphone which has not been processed with the first audio configuring.

The method may comprise compressing the output signal to a dynamic range of about 20 bits or 16 bits as the first audio configuring. The method may comprise downsampling the output signal to a sample rate of about 96 kHz or 48 kHz as the first audio configuring.

In another example, a non-transitory program storage device readable by a machine is provided, tangibly embodying a program of instructions executable by the machine for performing operations, the operations comprising recording a first audio track on a memory, where the first audio track comprises an output signal provided by a microphone which has been processed with a first audio configuring; and recording at least one second audio track on the memory with the first audio track, where the second audio track comprises the output signal provided by the microphone which has not been processed with the first audio configuring.

In another example, an apparatus comprises a player configured to play sound from an audio track; and a selector configured to select the audio track to be played by the player from a plurality of audio tracks of a same recorded sound, where each of the plurality of audio tracks has a different audio configuring of the same recorded sound, where the selector is configured to select the audio track to be played based, at least partially, upon an ability of the player to properly play the audio configuring of the audio track. The selector may be configured to automatically choose the audio track to be played. The selector may be configured to allow a user to choose the audio track to be played.

In another example, a non-transitory memory device comprises a first audio track having a first output signal, provided by at least one microphone, which has been processed with a first audio configuring to thereby have a first audio configuration; and a second audio track in a same file as the first audio track, where the second audio track has a second output signal, provided by the at least one microphone, which has not been processed with the first audio configuring to thereby have a second different audio configuration.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:
1. An apparatus comprising:
 at least one microphone;
 audio circuitry connected to the at least one microphone, where the audio circuitry is configured to output a first audio track and at least one second audio track, where the audio circuitry is configured to form the first audio track from at least one output signal, provided by the at least one microphone, by processing the at least one output signal with a first audio configuring and form the first audio track with a first audio resolution, and where the audio circuitry is configured to form the at least one second audio track from the same at least one output signal, provided by the same at least one microphone, by processing the at least one output signal with a different second audio configuring and form the at least one second audio track with a second different audio resolution;

a memory connected to the audio circuitry which is configured to store the first audio track and the at least one second audio track; and a selector configured to automatically select the first audio track or the at least one second audio track to be played after the first and second audio tracks have been stored in the memory, where a plurality of the audio tracks has a different audio resolution of a same sound received at the at least one microphone, where the apparatus is:
  configured to be able to play at least one of the respective audio resolutions, and
  configured to not be able to play at least one other one of the respective audio resolutions, and
where the selector is configured to automatically select the first audio track to be played or the at least one second audio track to be played based at least partially upon an audio resolution playing capability of the apparatus to play the at least one of the respective audio resolutions and an audio resolution playing incapability of the apparatus to play the at least one other one of the respective audio resolutions.

2. An apparatus as in claim 1 where the apparatus is configured to store the first audio track and the at least one second audio track in the memory in a common file.

3. An apparatus as in claim 1 where the audio circuitry is configured to process the at least one output signal with the first audio configuring comprising the at least one output signal being dynamic range lowered with a first range lowering to a dynamic range of about 20 bits or 16 bits.

4. An apparatus as in claim 1 where the audio circuitry is configured to process the at least one output signal with the first audio configuring comprising at least one of:
  the at least one output signal being expanded to a higher dynamic range,
  the at least one output signal being upsampled to a higher sample rate.

5. An apparatus as in claim 1 where the at least one output signal from the at least one microphone is processed by the at least one microphone with a microphone driver and hardware specific microphone processing.

6. An apparatus as in claim 1 where the audio circuitry is configured to perform at least one of:
  the processing of the at least one output signal to form the first audio track comprising noise reduction, upmixing, audio zooming, and/or audio encoding, and
  the processing of the at least one output signal to form the at least one second audio track comprising noise reduction, upmixing, audio zooming, and/or audio encoding.

7. An apparatus as in claim 1 where the audio circuitry is configured to form at least one of the second audio track(s) without any resampling and/or dynamic range changing.

8. An apparatus as in claim 3 where the audio circuitry is configured to form at least one of the second audio track(s) with the second audio configuring comprising a second different downsampling and/or a second different range lowering.

9. A method comprising:
  recording a first audio track on a memory of an apparatus, where the first audio track is formed from an output signal provided by a microphone, of sound received at the microphone, which has been processed with a first audio configuring and forms the first audio track with a first audio resolution;
  recording at least one second audio track on the memory with the first audio track, where the at least one second audio track is formed from the same output signal provided by the same microphone, of the same sound received at the microphone, which has been processed with a different second audio configuring and forms the second audio track with a second different audio resolution; and
  a selector of the apparatus automatically selecting the audio track to be played by the apparatus from the first audio track and the at least one second audio track after the first audio track and the at least one second audio track have been stored in the memory, where each of the audio tracks has a different audio resolution of the same sound, where the apparatus is configured to be able to play at least one of the respective audio resolutions and configured to not be able to play at least one other one of the respective audio resolutions, and where the selector automatically selects the audio track to be played based upon an audio resolution playing capability of the apparatus to play the at least one respective audio resolution of the selected audio track, where the apparatus is incapable of playing the at least one other one of the respective audio resolutions.

10. A method as in claim 9 where the recording of the first audio track and the recording of the at least one second audio track on the memory is in a common file.

11. A method as in claim 9 further comprising at least one of:
  compressing the output signal to a dynamic range of about 20 bits or 16 bits as the first audio configuring, and
  downsampling the output signal to a sample rate of about 96 kHz or 48 kHz as the first audio configuring.

12. A method as in claim 9 further comprising at least one of:
  providing a user an ability to select the first audio resolution of the first audio track including dynamic range and sample rate, and
  providing the user an ability to select the second different audio resolution of at least one of the second audio track(s) including dynamic range and sample rate of the at least one second audio track(s).

13. A non-transitory program storage device readable by a machine, tangibly embodying a program of instructions executable by the machine for performing operations, the operations comprising:
  recording a first audio track on a memory of an apparatus, where the first audio track is formed from an output signal provided by a microphone, of sound received at the microphone, which has been processed with a first audio configuring;
  recording at least one second audio track on the memory with the first audio track, where the second audio track is formed from the same output signal provided by the same microphone, of the same sound received at the microphone, which has been processed with a second different audio configuring;
  automatically selecting, by a selector of the apparatus, at least one of the audio tracks to be played by the apparatus from the audio tracks of the same sound received by the microphone after the first and second audio tracks have been stored in the memory, where a plurality of the audio tracks have different audio resolutions of the same sound, where the apparatus is configured to be able to play at least one of the respective audio resolutions and configured to not be able to play at least one other one of the respective audio resolutions, and where the selector automatically selects the audio track to be played based upon an audio resolution playing capability of the apparatus to play the at least one respective audio resolution of the selected at least one audio track and an audio resolution playing incapability of the apparatus to play the at least one other one of the respective audio resolutions; and the apparatus playing the automatically selected at least one audio track.

14. An apparatus as in claim 1 where the audio circuitry is configured to process the at least one output signal with the first audio configuring comprising the at least one output signal being downsampled with a first downsampling to a sample rate of about 96 kHz or 48 kHz.

* * * * *